(12) United States Patent
Resano et al.

(10) Patent No.: US 11,530,684 B2
(45) Date of Patent: Dec. 20, 2022

(54) WIND TURBINE AND PITCH BEARING OF THE WIND TURBINE

(71) Applicant: ACCIONA WINDPOWER, S.A., Navarra (ES)

(72) Inventors: Javier Pascual Resano, Navarra (ES); Jose Luis Aristegui Lantero, Navarra (ES); Gonzalo De los Rios Leiva, Navarra (ES); Teresa Arlaban Gabeiras, Navarra (ES); Jose Miguel Garcia Sayes, Navarra (ES); Miguel Nunez Polo, Navarra (ES); Jose Javier Gil Soto, Navarra (ES)

(73) Assignee: ACCIONA WINDPOWER, S.A., Barasoain Navarra (ES)

(*) Notice: Subject to any disclaimer, the term of this patent is extended or adjusted under 35 U.S.C. 154(b) by 0 days.

(21) Appl. No.: 17/456,322

(22) Filed: Nov. 23, 2021

(65) Prior Publication Data

US 2022/0082084 A1    Mar. 17, 2022

Related U.S. Application Data

(63) Continuation of application No. 15/792,215, filed on Oct. 24, 2017, now Pat. No. 11,293,399.

(30) Foreign Application Priority Data

Oct. 24, 2016  (EP) ..................... 16382484

(51) Int. Cl.
*F03D 7/02* (2006.01)
*F16C 33/58* (2006.01)
*F16C 19/52* (2006.01)
*F03D 1/06* (2006.01)
*F03D 80/70* (2016.01)
*F16C 19/16* (2006.01)

(52) U.S. Cl.
CPC ......... *F03D 7/0224* (2013.01); *F03D 1/0658* (2013.01); *F03D 80/70* (2016.05); *F16C 19/522* (2013.01); *F16C 33/586* (2013.01); *F05B 2260/79* (2013.01); *F05B 2280/702* (2013.01); *F16C 19/16* (2013.01); *F16C 2360/31* (2013.01); *Y02E 10/72* (2013.01)

(58) Field of Classification Search
CPC .......... F03D 1/06; F03D 1/0608; F03D 1/065; F03D 1/0691; F03D 7/02; F03B 80/70; F16C 33/58; F16C 33/586; F16C 19/08; F16C 19/522
USPC .............. 416/147, 131, 155, 174, 204 r, 205
See application file for complete search history.

(56) References Cited

U.S. PATENT DOCUMENTS 8,944,692 B2    2/2015  Hori
2007/0104577 A1*  5/2007  Hansen ................. F03D 7/0224
                                                         416/104

(Continued)

FOREIGN PATENT DOCUMENTS

WO    2007003866 A1    1/2007

*Primary Examiner* — Robert A Werner
(74) *Attorney, Agent, or Firm* — Lathrop GPM LLP

(57) ABSTRACT

Wind turbine comprising at least a pitch bearing comprising at least two rings, each of the at least two rings attached to a wind turbine component, being a first wind turbine component a blade and a second wind turbine component a hub, and further comprising at least one bearing reinforcement attached to at least one of the two rings. The invention also relates to the pitch bearing of the wind turbine.

19 Claims, 6 Drawing Sheets

(56) References Cited

U.S. PATENT DOCUMENTS

| | | |
|---|---|---|
| 2008/0193295 A1 | 8/2008 | Kirchner |
| 2008/0213095 A1 | 9/2008 | Bech |
| 2009/0311104 A1 | 12/2009 | Steffensen |
| 2013/0039768 A1 | 2/2013 | Iffland |
| 2013/0177419 A1 | 7/2013 | Zaehr |
| 2014/0355922 A1 | 12/2014 | Lindhoist |
| 2015/0086359 A1* | 3/2015 | Jacobsen ............... F03D 1/0633 416/174 |

* cited by examiner

WIND TURBINE AND PITCH BEARING OF THE WIND TURBINE

RELATED APPLICATIONS

This application is a continuation of U.S. application Ser. No. 15/792,215, filed Oct. 24, 2017. The contents of this application is incorporated herein by reference in its entirety.

OBJECT OF THE INVENTION

The present invention discloses a wind turbine comprising at least a pitch bearing comprising at least two rings, each of the at least two rings attached to a wind turbine component, being a first wind turbine component a blade and a second wind turbine component a hub, and further comprising at least one bearing reinforcement attached to at least one of the two rings. The invention also relates to the pitch bearing of the wind turbine.

BACKGROUND OF THE INVENTION

A wind turbine generally comprises a tower and nacelle positioned on top of the tower. A wind turbine rotor with three wind turbine blades is connected to the nacelle through a low speed shaft.

Modern wind turbines are provided with a pitch control system which is configured to pitch the blades in and out of the wind in order to modulate the energy capture as wind decreases or increases and hence to control the load on the rotor. The blades are pitched to optimize the output and to protect the wind turbine from excessive loading which could damage the wind turbine.

To perform the pitch control each blade is provided with a pitch bearing located between the hub and the blade, and a mechanism, usually a hydraulic cylinder or an electric motor, to provide the necessary force for pitching the blade. This pitching arrangement enables each blade to be turned approximately 9° around their longitudinal axis.

Modern wind turbine rotors are getting bigger in order to increase energy capture. This involves the use of longer and heavier blades which in turn implies an increase of the loads on the blades.

In pitch-controlled wind turbines these loads, which are not constant and depend on the pitch angle of the blade at each time, are transferred from the blades to the hub through the pitch bearing.

The pitch bearings have to be able to transfer the moment produced by the wind load to the hub and at the same time enable that the blades can still rotate in order to control the pitch angle.

This can be ensured by simply making the pitch bearings bigger (either larger diameter, thickness or height) but the use of bigger bearings would be economically disadvantageous as both the ring size and rollers size would increase and thereby increase the bearing weight and cost significantly.

Nevertheless, areas in the pitch bearing subjected to the maximum stresses vary depending on the position along the bearing circumference, but as it has been explained, generally the bearing is designed considering that the maximum stresses can appear all around the bearing. That is, as the pitch bearing design is determined by the maximum stresses associated to a specific pitch angle the bearing is oversized for other different angles.

As it has been explained, it is frequent to find specific parts of the bearing rings subjected to higher stresses than other parts of the bearing during the operation of the wind turbine. Sometimes, there are specific points in the bearing rings where stress concentrations can be found that may cause the bearing failure. These stress concentrations can be caused by:

high roughness of the bolt holes (the bolts are used for joining the bearings to the root of the blade and to the hub);

local defects caused during manufacture;

weak sections of the bearings (generally the areas in which the bearing balls are introduced);

high corrosion in the bolt holes;

critical sections due to increased loads in particular wind turbine locations.

A solution to this is to use local reinforcements achieved by means of reinforcing plates, instead of using bigger bearings with thicker rings. Thus, thinner bearings can be used which are specifically reinforced in areas where stresses are higher. The problem of introducing these specific reinforcements is that areas with very different stiffness appear in the area of bearing comprising the reinforcement as in areas where the reinforcing plates are located the stiffness is increased, while in adjoining areas the stiffness drops abruptly.

Document WO2007003866 (A1) discloses a pitch bearing of a wind turbine reinforced by means of such reinforcing plates.

Document US2014355922 (A1) also discloses a bearing of a wind turbine with a reinforcement attached to the bearing.

DESCRIPTION OF THE INVENTION

The present invention discloses a wind turbine comprising at least a pitch bearing comprising at least two rings, each of the at least two rings attached to a wind turbine component, being a first wind turbine component a blade and a second wind turbine component a hub, and further comprising at least one bearing reinforcement attached to at least one of the two rings.

The essential feature of the invention is that the at least one bearing reinforcement has a specific geometry in order to strengthen the most loaded areas of said pitch bearing while providing a smooth stiffness variation along it. The at least one bearing reinforcement thus helps to increase the life cycle of the pitch bearing of the wind turbine by optimally increasing the resultant stiffness of the pitch bearing.

Said reinforcement is joined to at least a ring of the pitch bearing and has a longitudinal dimension, which is measured in the circumferential direction of the pitch bearing; a width, which is measured in the radial direction of the pitch bearing; and a thickness, which is measured along the axial direction of the pitch bearing.

The reinforcement is attached to the at least one of the two rings of the pitch bearing.

The at least one bearing reinforcement comprises a bearing reinforcement thickness that is variable along the circumferential direction of the pitch bearing. Hence, the reinforcement strengthens the pitch bearing and enables a smoother stiffness distribution along it.

Preferably, the at least one bearing reinforcement is attached to the at least one of the two rings of the pitch bearing such that the at least one of the two rings is disposed between the at least one bearing reinforcement and the wind turbine component to which the at least one of the two rings is attached.

In one embodiment, the at least one bearing reinforcement comprises two ends and a central part disposed between the ends in a circumferential direction of the pitch bearing wherein the bearing reinforcement thickness of the at least one bearing reinforcement is variable along the circumferential direction of the pitch bearing from the ends towards the central part of the at least one bearing reinforcement.

Preferably, the reinforcement thickness of the at least one bearing reinforcement reaches a maximum reinforcement thickness in the central part of the at least one bearing reinforcement.

Also preferably, the reinforcement thickness is variable such that it increases from a minimum thickness provided in an area of the reinforcement close to one of its ends towards the maximum reinforcement thickness located in the central part of the at least one bearing reinforcement.

In an embodiment, the bearing reinforcement thickness of the at least one bearing reinforcement is variable along the circumferential direction of the pitch bearing from the ends towards the central part of the at least one bearing reinforcement in a symmetrical manner.

The at least one bearing reinforcement is attached to at least one of the two rings such that a maximum reinforcement thickness is located coinciding with an area of the pitch bearing subjected to the highest stresses or deformations in the pitch bearing, and therefore wherein more strengthening is needed.

The highest stresses may be achieved in a critical point of the pitch bearing but are generally reduced as getting further from said critical point in a circumferential direction of the pitch bearing. The solution of the present invention allows reducing the bearing reinforcement thickness in the circumferential direction of the pitch bearing from the maximum reinforcement thickness located coinciding with such a critical point (or points, as may be more than one) towards the ends of the at least one bearing reinforcement. Consequently, the pitch bearing design can still have a reduced thickness while achieving enough stiffness in the most critical areas by means of the solution of the present invention.

The bearing reinforcement thickness can be variable in the circumferential direction of the pitch bearing in a continuous manner in at least a part of the at least one bearing reinforcement or in a discontinuous manner.

Generally, the at least one bearing reinforcement is joined to at least one of the two rings by means of bolts. In case of the bearing reinforcement thickness being variable in the circumferential direction of the pitch bearing in a continuous manner, the at least one bearing comprises recesses in correspondence with said bolts to provide a flat surface to support bolt heads.

However, in a preferred embodiment of the invention wherein said variation is made in a discontinuous manner, the at least one bearing reinforcement comprises at least two reinforcing plates stacked together.

Preferably, the stacked reinforcing plates are flat.

This embodiment comprising the at least two stacked reinforcing plates allows obtaining a discontinuous variation of the bearing reinforcement thickness providing flat surfaces in the at least one bearing reinforcement for the support of bolt heads of the bolts, not needing the recesses in the at least one bearing reinforcement. Advantageously the manipulation of the stacked reinforcing plates and its manufacturing is easier. The weight of the at least one bearing reinforcement is divided within the stacked reinforcing plates that comprise it and are easy to operate with and to assemble.

In a preferred embodiment a plurality of stacked reinforcing plates, with different longitudinal dimensions and optionally with different thicknesses are stacked to form the at least one bearing reinforcement. In this embodiment, the variation of the reinforcement thickness is obtained according to different combinations of stacked reinforcing plates. This variation is adapted to the requirements of the pitch bearing.

In this embodiment, the bearing reinforcement is configured in such a way that a greater number of stacked reinforcing plates are provided within the most critical area, the number of stacked reinforcing plates diminishing in adjoining areas. In this way, a smooth stiffness is achieved along the circumferential direction of the pitch bearing.

In some preferred embodiments of the at least one bearing reinforcement comprising at least two stacked reinforcing plates, each one of the at least two stacked reinforcing plates has a different longitudinal dimension and is stacked along a different angular sector over the at least one of the two rings to which the at least one bearing reinforcement is attached.

Preferably, one of the stacked reinforcing plates is closer to the at least one of the two rings to which the at least one bearing reinforcement is attached and wherein the longitudinal dimension of the stacked reinforcing plate closer to the at least one of the two rings to which the at least one bearing reinforcement is attached is greater than the longitudinal dimension of the at least other stacked reinforcing plate such that it extends along a greater angular sector over the at least one of the two rings to which the at least one bearing reinforcement is attached.

In an embodiment, the stacked reinforcing plates have substantially the same thickness.

Optionally, one of the stacked reinforcing plates is closer to the at least one of the two rings to which the at least one bearing reinforcement is attached and a thickness of the stacked reinforcing plate closer to the at least one of the two rings to which the at least one bearing reinforcement is attached is greater than a thickness of the at least other stacked reinforcing plate. Alternatively, one of the stacked reinforcing plates is closer to the at least one of the two rings to which the at least one bearing reinforcement is attached and wherein a thickness of the stacked reinforcing plate closer to the at least one of the two rings to which the at least one bearing reinforcement is attached is smaller than a thickness of the at least other stacked reinforcing plate. The selection between both alternatives is provided by studying the stress transition along the circumferential direction of the ring to which the bearing reinforcement is attached, in such a way that if a high stress concentration is seeing at a critical point, being reduced abruptly, the second alternative may be selected.

The invention also relates to a pitch bearing of the wind turbine, the pitch bearing comprising at least two rings, each of the at least two rings attached to a wind turbine component, being a first wind turbine component a blade and a second wind turbine component a hub, and further comprising at least one bearing reinforcement attached to at least one of the two rings, wherein the at least one bearing reinforcement comprises a bearing reinforcement thickness that is variable along a circumferential direction of the pitch bearing.

In an embodiment of the invention, a width of the at least one bearing reinforcement is bigger than a width of the at least one of the two rings to which the at least one bearing reinforcement is attached, such that the at least one bearing reinforcement projects along the radial direction beyond the limit of the at least one of the two rings of the pitch bearing, to provide extra-reinforcement. Alternatively, the width of the at least one bearing reinforcement is substantially equal to a width of the at least one of the two rings to which the at least one bearing reinforcement is attached. In this case the at least one bearing reinforcement is not projected beyond the limit of the the at least one of the two rings of the pitch bearing, along the radial direction, in order not to interfere with the hub covering. In this case it is not necessary to modify the structure of the hub.

Preferably, the pitch bearing comprises an outer ring and an inner ring.

Also preferably, the at least one bearing reinforcement is attached to the outer ring.

DESCRIPTION OF THE DRAWINGS

To complement the description being made and in order to aid towards a better understanding of the characteristics of the invention, in accordance with a preferred example of practical embodiment thereof, a set of drawings is attached as an integral part of said description wherein, with illustrative and non-limiting character, the following has been represented:

FIG. 3b is a section view DD of FIG. 3a.

PREFERRED EMBODIMENT OF THE INVENTION

Figure 1:
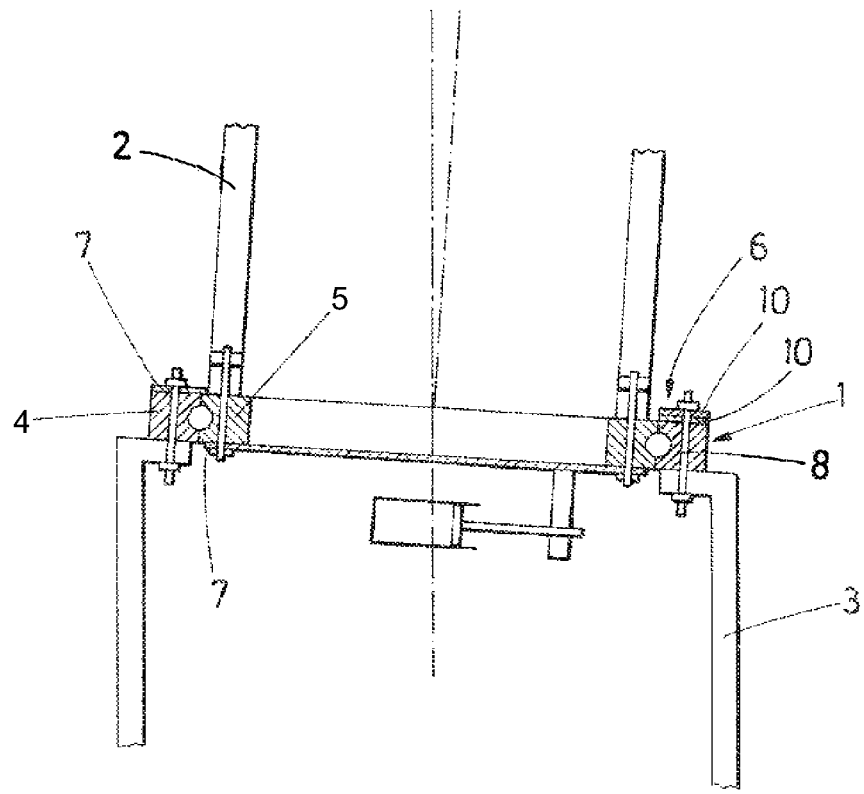
FIG. 1 shows the location of a pitch bearing of the wind turbine between at least a root of a wind turbine blade and at least one hub connection. In the figure the location surface of the pitch bearing that is not in contact with the root blade or with the hub can be appreciated.

The present invention refers to a wind turbine comprising at least a pitch bearing (1) comprising at least two rings (4, 5), preferably an outer ring (4) and an inner ring (5), each of the at least two rings (4, 5) attached to a wind turbine component (2, 3), being a first wind turbine component a blade (2) and a second wind turbine component a hub (3), and further comprising at least one bearing reinforcement (6) attached to at least one of the two rings (4, 5).

The essential feature of the wind turbine of the invention is that it comprises at least one bearing reinforcement (6) which is attached to at least to one of the two rings (4, 5) of the pitch bearing (1) the at least one bearing reinforcement (6) comprising a bearing reinforcement thickness (RT) that is variable along a circumferential direction of the pitch bearing (1).

This bearing reinforcement (6) thus provides the pitch bearing (1) with a smooth stiffness variation along its circumferential direction.

Preferably, the at least one bearing reinforcement (6) is attached to the at least one of the two rings (4, 5) of the pitch bearing (1) such that the at least one of the two rings (4, 5) is disposed between the at least one bearing reinforcement (6) and the wind turbine component (2, 3) to which the at least one of the two rings (4, 5) is attached. In an embodiment, the at least one bearing reinforcement (6) is attached to the outer ring (4) of the pitch bearing (1), which is in turn attached to the hub (3), being the outer ring (4) disposed between the at least one bearing reinforcement (6) and the hub (3).

In an embodiment, the at least one bearing reinforcement (6) is attached to at least to one of the two rings (4, 5) of the pitch bearing (1) on a location surface different than the surface of the pitch bearing (1) in contact with the blade (2) or with the hub (3).

In an embodiment, the at least one bearing reinforcement (6) is attached to at least to one of the two rings (4, 5) of the pitch bearing (1) such that an intermediate component is disposed between the at least one of the two rings (4, 5) to which the at least one bearing reinforcement (6) is attached. In particular, in an embodiment of the invention, the at least one bearing reinforcement (6) is attached to the inner ring (5) of the pitch bearing (1) which is in turn attached to the blade (2), such that a pitch plate configured to drive the pitch bearing (1) is disposed between the at least one bearing reinforcement (6) and the inner ring (5).

Figure 2:
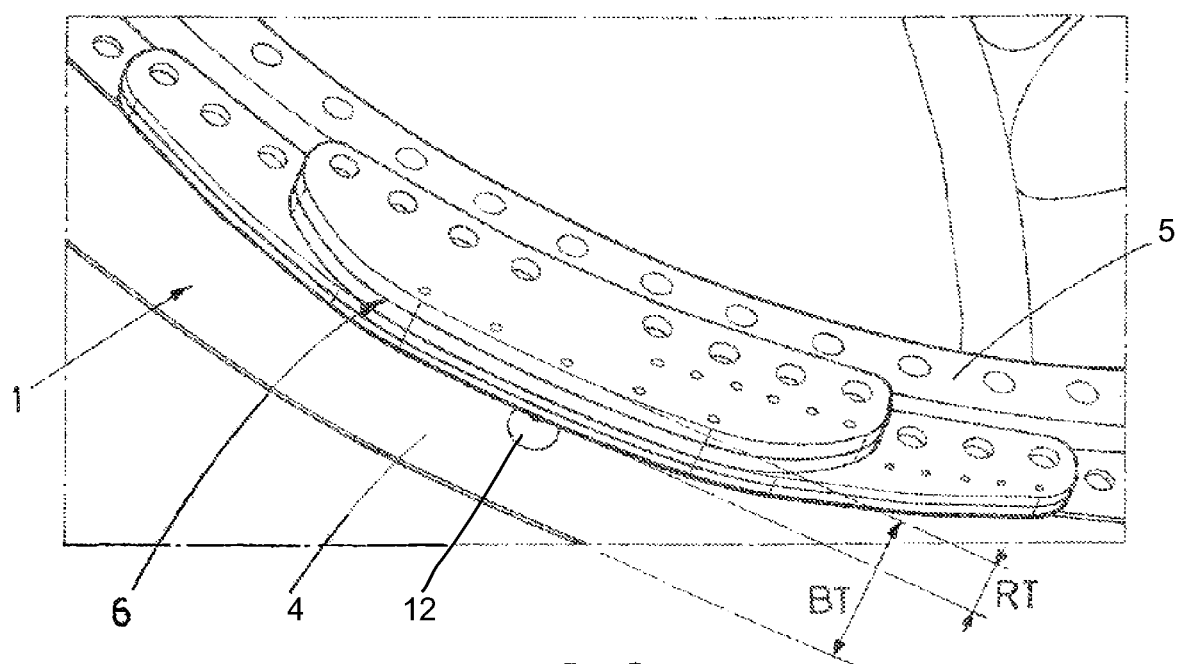
FIG. 2 shows a pitch bearing of the present invention with a bearing reinforcement attached to the outer ring.

In an embodiment of the invention, the bearing reinforcement thickness (RT) is variable in a continuous manner in at least part of its longitudinal dimension. Therefore the strength distribution on the pitch bearing (1) decreases in a continuous manner. In another preferred embodiment, the bearing reinforcement thickness (RT) is variable in a discontinuous manner, such that step-like reinforcement thickness (RT) variations are provided along the longitudinal dimension of the bearing reinforcement. In FIG. 2, the bearing thickness (BT) and the variation of the bearing reinforcement thickness (RT) can be seen. As a result of the reinforcement thickness variation, the resultant thickness and hence the resultant stiffness of the bearing varies as required by the stresses distribution.

In a further embodiment, the at least one bearing reinforcement (6) may have a continuous variation of the bearing reinforcement thickness (RT) of at least a part of the bearing reinforcement (6) in the circumferential direction of the pitch bearing (1).

Preferably, the at least one bearing reinforcement (6) comprises a planar central part defined in the circumferential direction of the pitch bearing (1).

Figure 4:
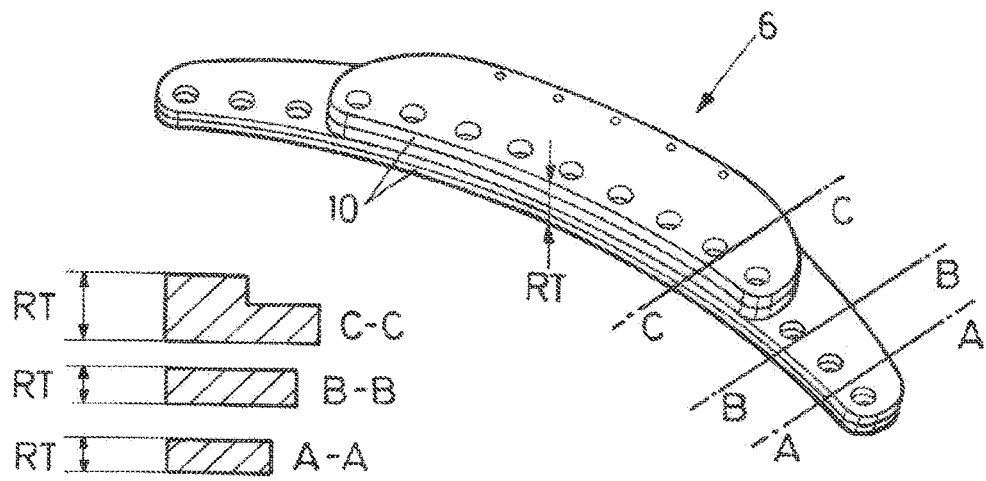
FIG. 4 shows an embodiment of the bearing reinforcement in which it comprises a plurality of stacked reinforcing plates.

In an embodiment, the length of the planar central part of the at least one bearing reinforcement (6) is similar to the longitudinal dimension of the at least one bearing reinforcement (6) measured in the circumferential direction of the pitch bearing (1), as can be seen in FIG. 2 or 4.

In an embodiment of the invention, the at least one bearing reinforcement (6) is attached to at least one of the two rings (4, 5) such that the maximum bearing reinforcement thickness (RT) is located coinciding with an area of the pitch bearing (1) subjected to the highest stresses or deformations. Some examples of these embodiments can be seen in FIGS. 5 to 7.

If the at least one bearing reinforcement (6) has a continuous variation of the bearing reinforcement thickness (RT) in the circumferential direction of the pitch bearing (1) (similar to a wedge and hence called wedged reinforcement), given that the at least one bearing reinforcement (6) is joined to the at least one of the two rings (4, 5) by bolts (8) usually parallel to the bearing axis (and thus not perpendicular to the reinforcement surface, at least in part of it), a special solution has to be found since a priori there is no a flat surface perpendicular to the bolts and hence the heads of the bolts do not properly match the support surface.

Figure 3A:
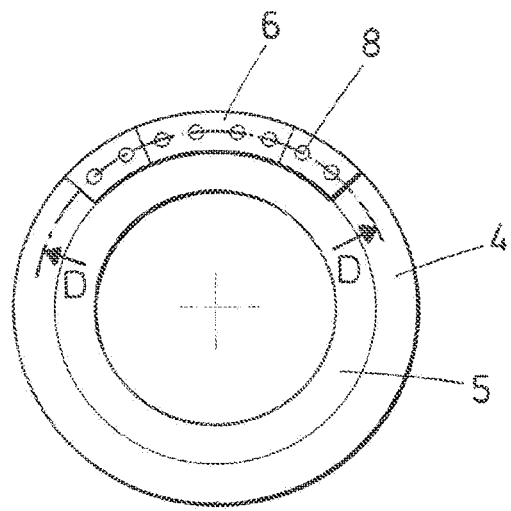
FIG. 3a shows a top view of a pitch bearing wherein the bearing reinforcement has a continuous thickness variation in at least part of its longitudinal dimension.
Figure 3B:
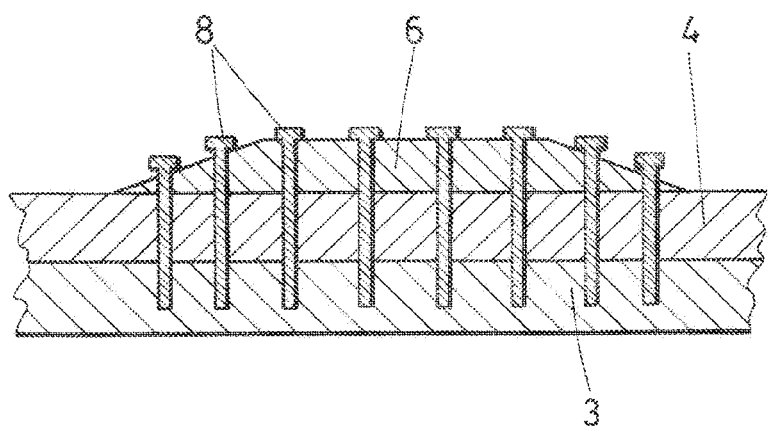
Figure 3C:
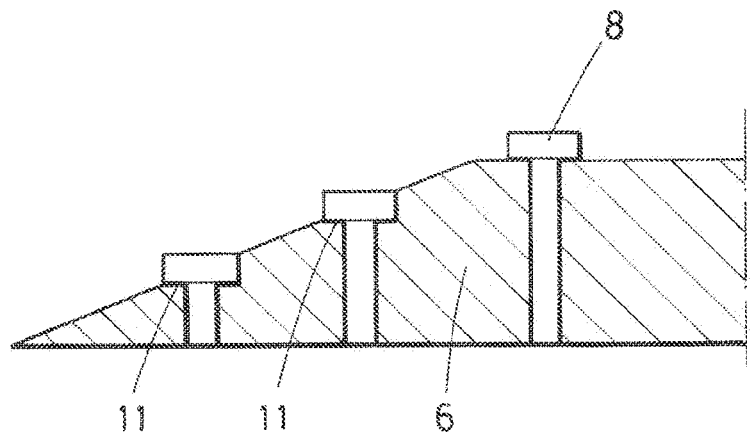
FIG. 3c-d show details of embodiments of the bearing reinforcement having a continuous thickness variation in at least part of its longitudinal dimension.

A possible embodiment of the present invention, shown in FIG. 3c, solves the above described problem by providing the at least one bearing reinforcement (6) with a recess (11) in correspondence to each bolt hole to provide a flat support surface for the bolt (8) heads.

Figure 3D:
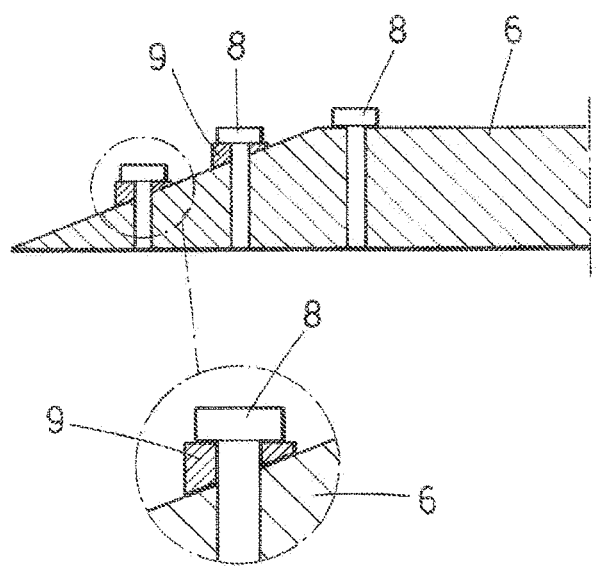

Another solution is shown in FIG. 3d. In this case, there is at least a counter-wedge (9) on the superior surface of the bearing reinforcement (6) with a continuous thickness variation to obtain a flat support for the bolt (8) head.

In a preferred embodiment, the at least one bearing reinforcement (6) comprises a flat surface disposed in contact with at least one of the two rings (4, 5), for example, in contact with the outer ring (4), and a flat opposing surface obliquus to the surface disposed in contact with the outer ring (4), such that the bearing reinforcement thickness (RT) varies with a constant slope towards the the planar central part where the maximum bearing reinforcement thickness of the bearing reinforcement (6) is reached. In such a case, preferably the counter-wedges have a surface with the same slope than the flat opposing surface obliquus to the surface disposed in contact with the outer ring and a flat surface perpendicular to the bolts axis. In an exemplary embodiment of the invention, a plurality of counter-wedges (9) is used, in the form of washer, in correspondence with each bolt hole.

In FIG. 4 a preferred embodiment of the bearing reinforcement (6) can be appreciated. Preferably, the at least one bearing reinforcement (6) comprises at least two reinforcing plates (10) stacked such that the resultant bearing reinforcement thickness (RT) is variable along the circumferential direction of the pitch bearing (1), i.e. non-constant. In this case, the at least one bearing reinforcement (6) comprises a plurality of stacked reinforcing plates (10).

In an embodiment, the at least one bearing reinforcement (6) comprises at least two stacked reinforcing plates (10) each one having a different longitudinal dimension extending along a different angular sector over the pitch bearing (1).

Figure 8:
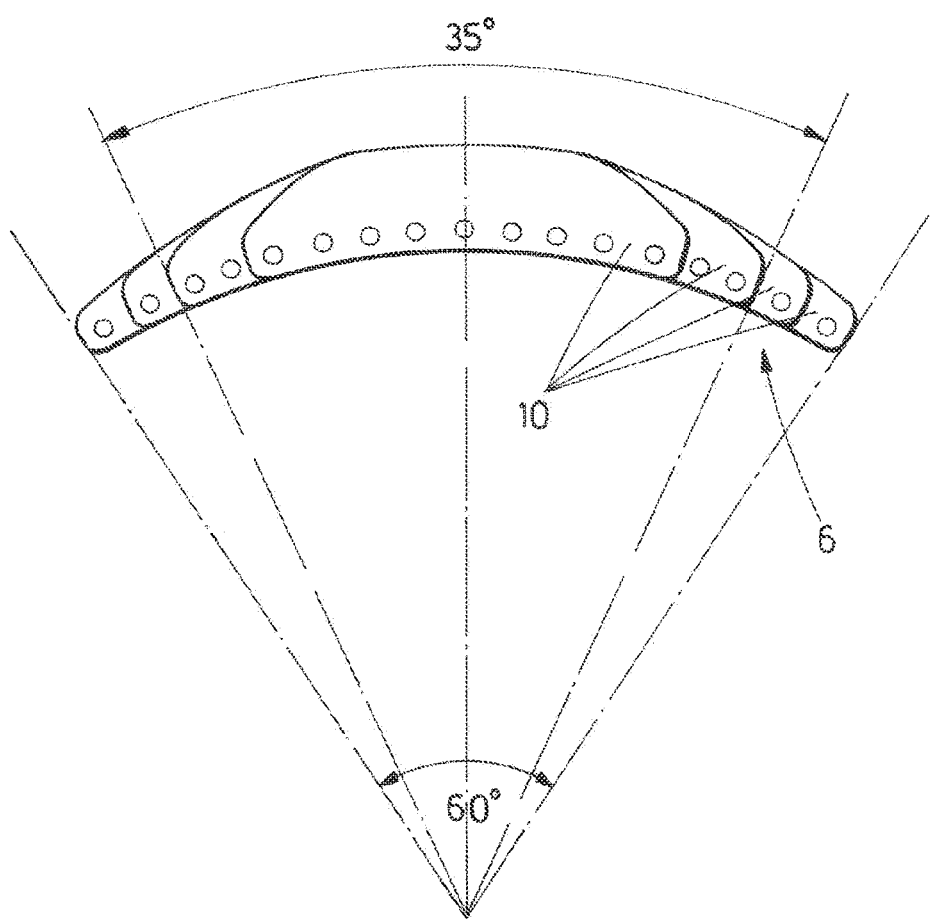
FIG. 8 shows an embodiment wherein the bearing reinforcement comprising a plurality of stacked reinforcing plates which cover decreasing angular sectors.

In FIG. 8 a bearing reinforcement (6) comprising a plurality of stacked reinforcing plates (10) is represented. As can be seen in the FIG. 8, those staked reinforcing plates (10) have different longitudinal dimensions thus extending through angular sectors of different sizes.

Figure 5:
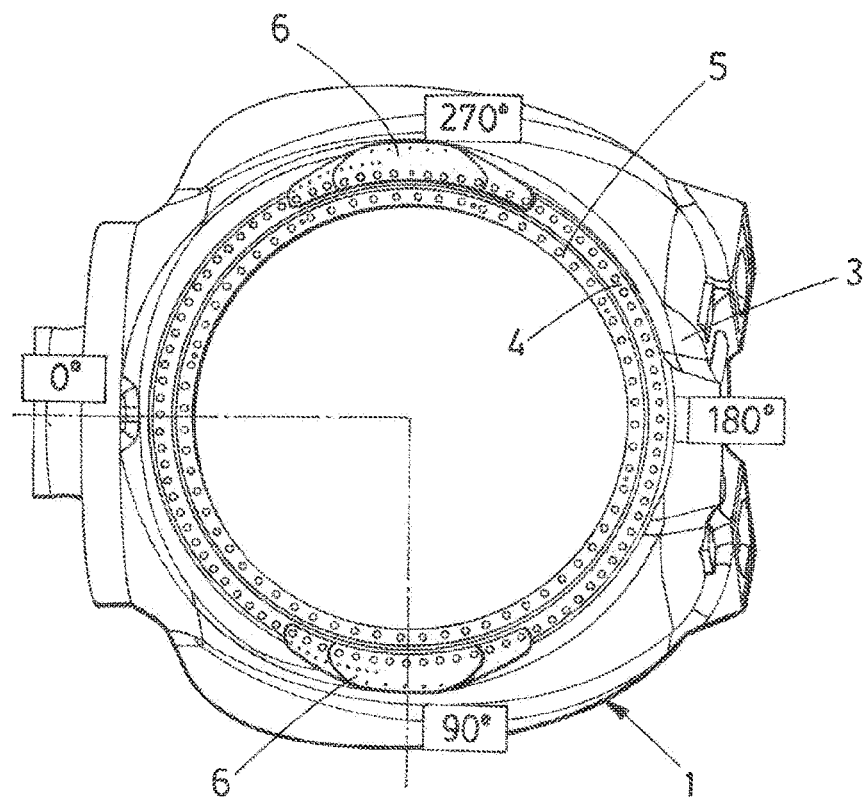
FIG. 5 shows a pitch bearing comprising two bearing reinforcements placed opposite to each other.
Figure 6:
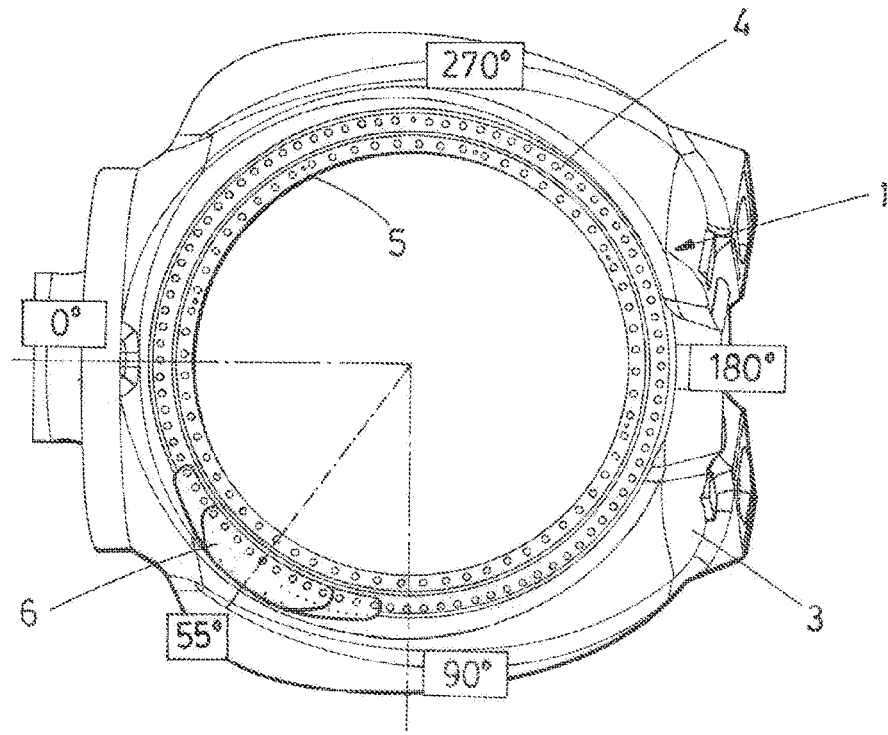
FIG. 6 shows a pitch bearing comprising one bearing reinforcement.

Preferably, one of the staked reinforcing plates (10) is in contact with one of the two rings (4, 5) of the pitch bearing (1) and the longitudinal dimension of the staked reinforcing plate (10) in contact with one of the two rings (4, 5) of the pitch bearing (1) is greater than the longitudinal dimension of the at least other stacked reinforcing plate (10) such that it extends along a greater angular sector over the pitch bearing (1). This embodiment allows a gradual stiffness transition along the circumferential direction of the bearing reinforcement (6), but providing a cost effective solution, as it can be achieved by planar plates, cheaper to manufacture than the wedged reinforcement. In FIGS. 5 and 6 two possible embodiments of the bearing reinforcement (6) comprising staked reinforcing plates (10) with this configuration are represented.

In FIG. 8, the bearing reinforcement (6) comprises a plurality of staked reinforcing plates (10) which cover decreasing angular sectors of the at least one of the two rings (4, 5), in this case, the outer ring (4) of the pitch bearing (1). In that figure an example in which the largest stacked reinforcing plate (10) corresponds to an angular sector of 60° can be appreciated. In the same figure there are represented other stacked reinforcing plates (10) as for example the one corresponding to an angular sector of 35°, this being stacked over the largest stacked reinforcing plate (10).

This embodiment allows having a higher stiffness in the critical zone. At the ends of the bearing reinforcement (6) only a few reinforcing plates (10) are stacked, hence providing there a minimum bearing reinforcement thickness (RT), for a smooth stiffness transition from the outer ring (4) area without bearing reinforcement (6). For example, in this embodiment, just two stacked reinforcing plates (10) extend all over the length of the bearing reinforcement (6) while four stacked reinforcing plates (10) extend in the central part, hence achieving there the maximum thickness.

In an exemplary embodiment of the invention, the bearing reinforcement thickness (RT) is variable from its ends towards its center along the circumferential direction of the pitch bearing (1). The bearing reinforcement thickness (RT) can be greater in the centre, Also, the bearing reinforcement thickness (RT) variation can be symmetrical.

Also, in an embodiment, the stacked reinforcing plates (10) can have the same thickness, as for example in the embodiment of FIG. 4. In said figure different cross sections of said bearing reinforcement (6) can be appreciated (sections AA, BB, CC). Said different cross sections are variable in height in a discontinuous manner from the ends to the center in the circumferential direction of the pitch bearing (1), i.e. the bearing reinforcement (6) has a variable bearing reinforcement thickness (RT).

In an embodiment of the invention, shown in FIG. 5, the pitch bearing (1) is a rolling element bearing, preferably a ball bearing or a roller bearing, and the bearing reinforcement (6) is placed in a section of one of the two rings (4, 5) near to the position of an orifice (12) for the insertion of the rolling element.

In a double raceway rolling element bearing (with a first raceway closer to the blade (2) and a second raceway closer to the hub (3)) there are two orifices for the insertion of the rolling elements in the outer ring (4) of the pitch bearing (1), which are placed opposite to each other. In these cases, the wind turbine comprises at least two bearing reinforcements (6) which are placed near those orifices of the pitch bearing (1). Particularly the at least two bearing reinforcements (6) are centered in the section of introduction of the rolling elements in the pitch bearing (1).

As can be seen in said FIG. 5, the positions for the introduction of the rolling elements are considered to be at 90° and 270°. The 0° has been selected to point the section of the pitch bearing (1) that is closer to the main shaft of the wind turbine and 180° is the section of the bearing closer to wind turbine nose.

In an alternative embodiment shown in FIG. 6 there is only one bearing reinforcement (6) placed at an angle of 55°. In another example two bearing reinforcements (6) placed at 55° and 235° respectively are provided.

Figure 7:
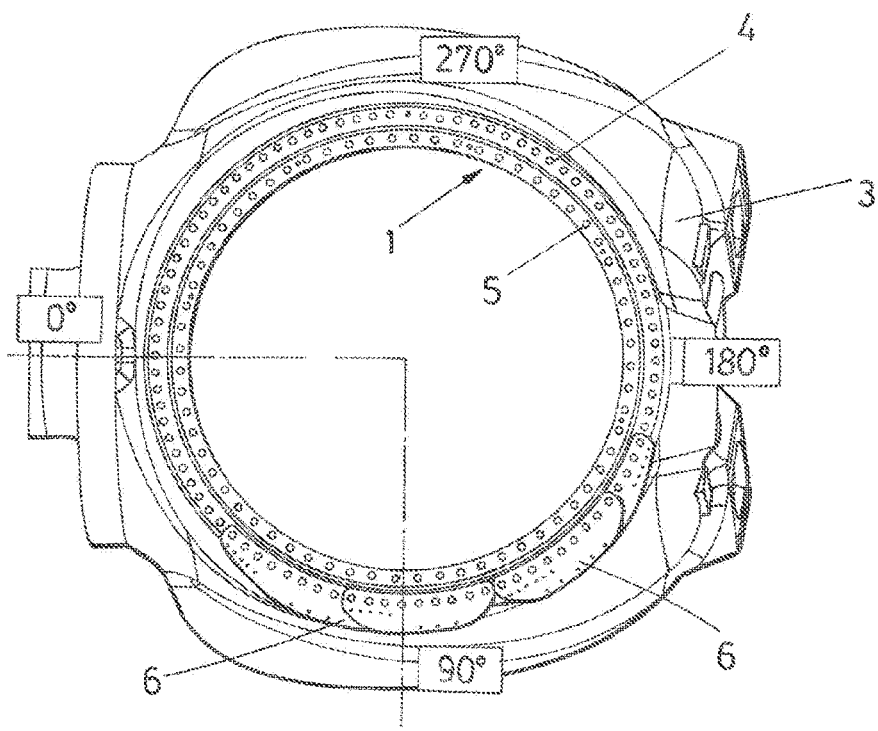
FIG. 7 shows a pitch bearing comprising a plurality of bearing reinforcements placed together.

The bearing reinforcements (6) can be placed also in other critical sections of the pitch bearing (1) as for example over a sector placed between the 90° and the 180° positions. In FIG. 7 can be shown an embodiment in which the pitch bearing (1) is reinforced with a plurality of bearing reinforcements (6) close to each other.

In a preferred embodiment the ratio between the maximum bearing reinforcement thickness (RT) and the bearing thickness (BT) is at least 15%, more preferably at least 25%

Another preferential feature is that a width of the at least one bearing reinforcement (6) is substantially equal to a width of the at least one of the two rings (4, 5) to which the at least one bearing reinforcement (6) is attached.

In another embodiment, the outer ring (4) is attached to the hub (3), wherein the at least one bearing reinforcement (6) is attached to a planar surface of the outer ring (4) opposite to planar surface closer to the hub (3).

Consequently, the proposed wind turbine comprises at least one bearing reinforcement (6) which allows the pitch bearing (1) transferring the stresses in an even smoother way than the pitch bearings (1) of the state of the art.

The invention claimed is:

1. A pitch bearing comprising:
   at least two rings, each of the at least two rings being attached to a first or second wind turbine component, the first wind turbine component being a blade and the second wind turbine component being hub; and
   at least one bearing reinforcement attached to at least one of the two rings,
   wherein the at least one bearing reinforcement comprises a bearing reinforcement thickness that is variable along a circumferential direction of the pitch bearing,
   wherein the at least one bearing reinforcement comprises two ends and a central part disposed between the ends in a circumferential direction of the pitch bearing wherein the bearing reinforcement thickness of the at least one bearing reinforcement is variable along the circumferential direction of the pitch bearing from the ends towards the central part of the at least one bearing reinforcement, wherein a ratio between a maximum bearing reinforcement thickness and a bearing thickness is at least 15%, and
   wherein the at least one bearing reinforcement is attached to at least one of the two rings such that, in use, the at least one of the two rings is disposed, along the axial direction of the pitch bearing, between the at least one bearing reinforcement and the wind turbine component to which the at least one of the two rings is attached.

2. The pitch bearing according to claim 1, wherein the bearing reinforcement thickness of the at least one bearing reinforcement reaches a maximum reinforcement thickness in the central part of the at least one bearing reinforcement.

3. The pitch bearing according to claim 1, wherein the bearing reinforcement thickness of the at least one bearing reinforcement is variable along the circumferential direction of the pitch bearing from the ends towards the central part of the at least one bearing reinforcement in a symmetrical manner.

4. The pitch bearing according to claim 1, wherein the at least one bearing reinforcement is attached to at least one of the two rings such that a maximum reinforcement thickness is located coinciding with an area of the pitch bearing subjected to the highest stresses or deformations in the pitch bearing.

5. The pitch bearing according to claim 1, wherein the bearing reinforcement thickness is variable in the circumferential direction of the pitch bearing in a continuous manner in at least a part of the at least one bearing reinforcement.

6. The pitch bearing according to claim 1, wherein the at least one bearing reinforcement comprises recesses in correspondence with bolts to provide a flat surface to support bolt heads.

7. The pitch bearing according to claim 1, wherein the at least one bearing reinforcement thickness is variable in the circumferential direction of the pitch bearing in a discontinuous manner.

8. The pitch bearing according to claim 7, wherein the at least one bearing reinforcement comprises at least two stacked reinforcing plates.

9. The pitch bearing according to claim 8, wherein each one of the at least two stacked reinforcing plates has a different longitudinal dimension and is stacked along a different angular sector over the at least one of the two rings to which the at least one bearing reinforcement is attached.

10. The pitch bearing according to claim 9, wherein one of the stacked reinforcing plates is closer to the at least one of the two rings to which the at least one bearing reinforcement is attached than the at least one other reinforcement plate of the stacked reinforcing plates and wherein the longitudinal dimension of the stacked reinforcing plate closer to the at least one of the two rings to which the at least one bearing reinforcement is attached is greater than the longitudinal dimension of the at least one other stacked reinforcing plate such that it extends along a greater angular sector over the at least one of the two rings to which the at least one bearing reinforcement is attached.

11. The pitch bearing according to claim 8, wherein one of the stacked reinforcing plates is closer to the at least one of the two rings to which the at least one bearing reinforcement is attached than the at least one other reinforcement plate of the stacked reinforcing plates and wherein a thickness of the stacked reinforcing plate closer to the at least one of the two rings to which the at least one bearing reinforcement is attached is greater than a thickness of the at least one other stacked reinforcing plate.

12. The pitch bearing according to claim 8, wherein one of the stacked reinforcing plate is closer to the at least one of the two rings to which the at least one bearing reinforcement is attached than the at least one other reinforcement plate of the stacked reinforcing plates and wherein a thickness of the stacked reinforcing plate closer to the at least one of the two rings to which the at least one bearing reinforcement is attached is smaller than a thickness of the at least one other stacked reinforcing plate.

13. The pitch bearing according to claim 8, wherein the stacked reinforcing plates have substantially the same thickness.

14. The pitch bearing according to claim 1, wherein a width of the at least one bearing reinforcement is substantially equal to a width of the at least one of the two rings to which the at least one bearing reinforcement is attached.

15. The pitch bearing according to claim 1, wherein the pitch bearing is a rolling element bearing and the at least one bearing reinforcement is located coinciding with an area of the pitch bearing near to the position of an orifice for the insertion of the rolling element.

16. The pitch bearing according to claim 1, wherein the at least two rings comprise an outer ring and an inner ring, wherein the at least one bearing reinforcement is attached to the outer ring.

17. The pitch bearing according to claim 16, wherein the outer ring is attached to the hub, wherein the at least one bearing reinforcement is attached to a planar surface of the outer ring opposite to a planar surface closer to the hub.

18. A wind turbine comprising the pitch bearing according to claim 1.

19. The pitch bearing according to claim 1, wherein the ratio between the maximum bearing reinforcement thickness and the bearing thickness is at least 25%.

* * * * *